E. N. MAULL.
WASHING APPARATUS.
APPLICATION FILED FEB. 1, 1922.

1,419,399.

Patented June 13, 1922.
3 SHEETS—SHEET 3.

INVENTOR.
E. N. Maull
BY Acker & Totten
his ATTORNEYS.

UNITED STATES PATENT OFFICE.

EDWARD N. MAULL, OF ORLANDO, FLORIDA, ASSIGNOR TO SKINNER MACHINERY COMPANY, OF DUNEDIN, FLORIDA, A CORPORATION OF FLORIDA.

WASHING APPARATUS.

1,419,399.  Specification of Letters Patent.  Patented June 13, 1922.

Application filed February 1, 1922. Serial No. 533,263.

*To all whom it may concern:*

Be it known that I, EDWARD N. MAULL, a citizen of the United States, residing at Orlando, in the county of Orange and State of Florida, have invented certain new and useful Improvements in Washing Apparatus, of which the following is a specification.

This invention relates to a washing apparatus, designed particularly for washing citrus fruits such as oranges and the like, and the invention has for its principal object to provide means associated with a brush whereby two runways for the travel of the fruit as washed are provided for each single brush; to provide a means whereby the fruit as acted on by the brushes is caused to travel to and fro transversely of the axis of rotation of the brush in its movement longitudinally thereof.

A further object is to provide a washing apparatus wherein water is supplied to the brushes and to the fruit during the washing operation, and wherein the speed of travel of the fruit longitudinally of the brushes is controlled solely by their inclination, which is capable of adjustment.

The invention consists primarily in providing in connection with a rotating brush, a cradle, the side walls of which oscillate on an axis concentric of the axis of rotation of the brush affording parallel runways for the fruit at opposite sides of the brush, and which are movable transversely of the brush on the rocking or oscillating of the cradle.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Figure 2:
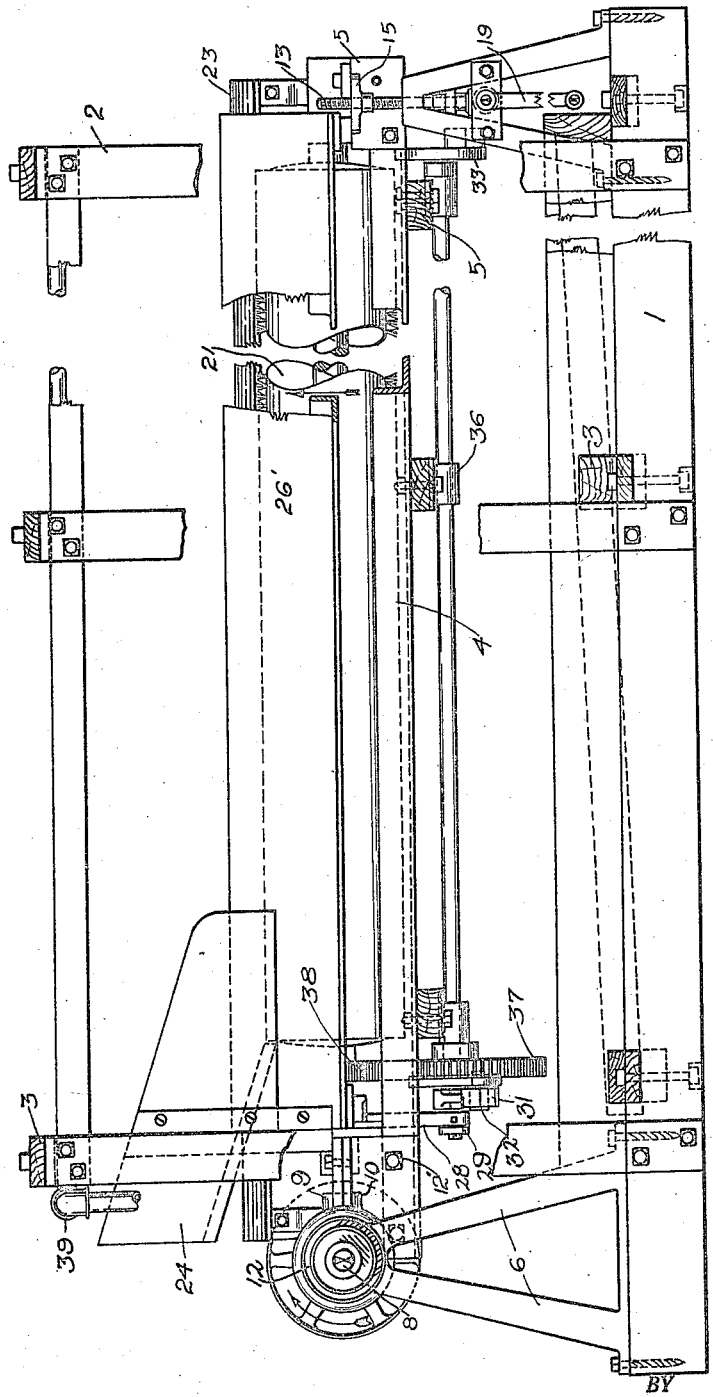
Figure 2 is a side elevation partly in section of the apparatus illustrated in Figure 1.
Figure 3:
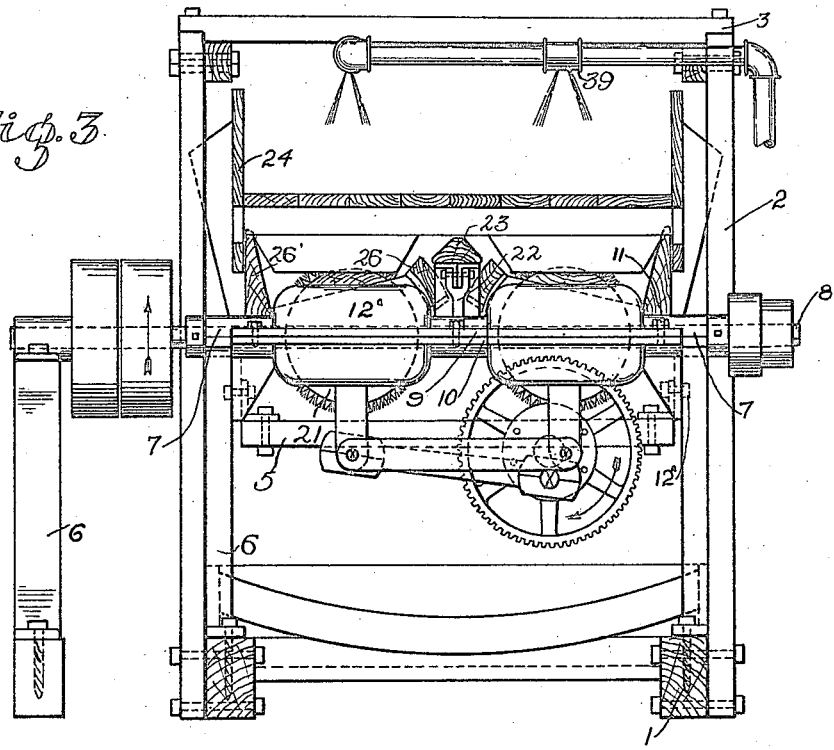
Figure 3 is a left end elevation of the apparatus illustrated in Figure 1.
Figure 4:
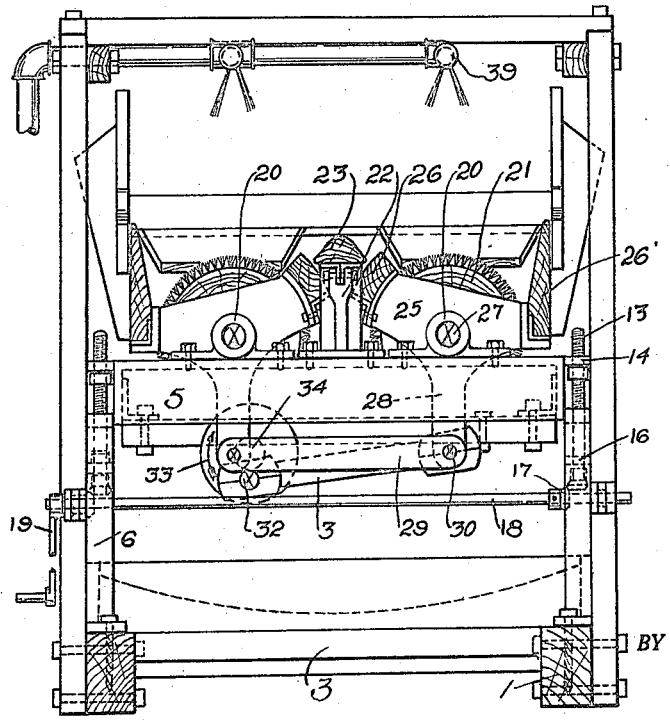
Figure 4 is a right end elevation of Figure 1.

In the drawings, wherein like characters of reference designate corresponding parts in the embodiment illustrated—a main frame is provided consisting of the base members 1, vertical side members 2 and top members 3, and within said frame 1 is mounted a secondary or supporting frame consisting of the parallel side members 4 and transverse members 5, said supporting frame mounting the brushes and other co-operating mechanism hereinafter described. Resting on the members 1 at the forward end of the main frame and extending upwardly are suitable supports 6 terminating in boxes 7 at their upper ends in which is rotatably mounted a transversely disposed drive shaft 8. Around the shaft between the members 6 is bolted a gear housing consisting of the co-operating halves 9 and 10 detachably held together by bolts 11, the housing being provided with enlarged gear chambers 12. The members 9 and 10 of the housing are secured to one end of the supporting frame members 4 by bolts 12′, Figures 2 and 3 of the drawings, in such manner that the shaft 8 provides a support and point of fulcrum for one end of the supporting frame. The supporting frame at its other end is vertically adjustable through a pair of rotatably mounted adjusting screws 13 operating within threaded openings 14 in suitable plates 15 secured to one of the cross members 5. The members 13 are held from vertical movement but are capable of rotation in bearings 16, and are operated through a miter gear connection 17 with an operating shaft 18 provided with a handle 19. The operation of the handle in turn rotates the adjusting screws 13 which support the weight of the free end of the supporting frame and retain the same in its adjusted position.

Figure 1:
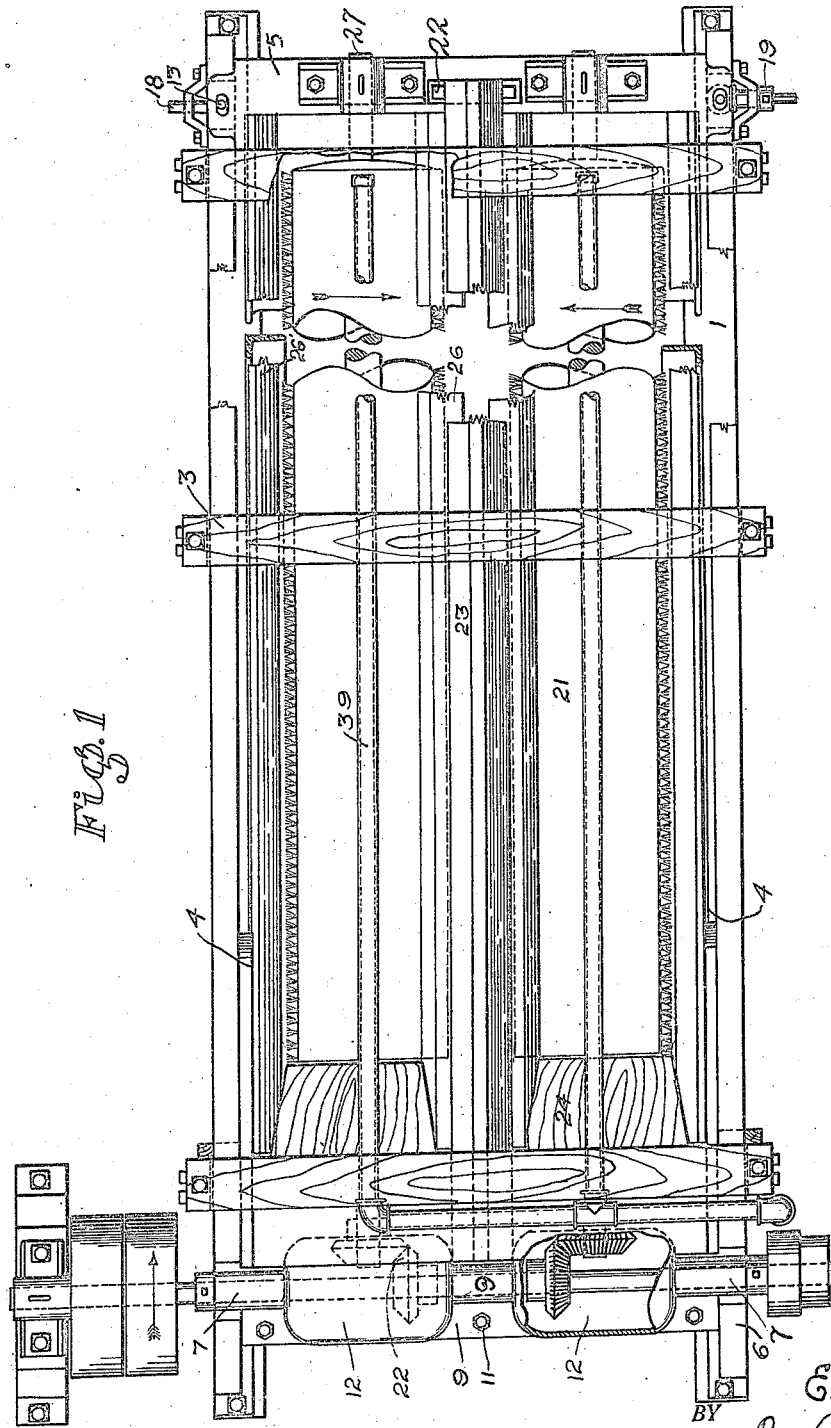
Figure 1 is a view in plan of the preferred embodiment of my invention with certain portions thereof illustrated in fragmentary section.

Disposed in parallel spaced relation in the supporting frame and journaled at their opposite ends in bearings 20 are the cylindrical brushes 21, the same at one end having a miter gear connection 22 with the shaft 8, the rotation of which in the direction of the arrow Figure 1 is adapted to rotate said brushes toward the center of the supporting frame. Extending longitudinally of the supporting frame between the brushes and supported at its ends slightly above the brushes on brackets 22 is a main fruit directing wall 23 adapted for directing the fruit delivered on to the brushes from feed troughs 24. Associated with each brush is a cradle consisting of end members 25 connected by the side frame members 26 and 26', each disposed parallel with the surface of the brush at opposite sides of its longitudinal center, the surface of the side wall 26 extending substantially radially of the brush surface and the surface of the wall 26' being disposed at an acute angle relative to the brush surface. The end members 25 are fulcrumed on the respective trunnions 27 of the brushes 21, and are adapted for oscillation to move said cradle side frame members transversely in a to and fro course over the upper surface of the respective brushes, each of said side frame members providing with the brush a fruit runway. Thus by the incorporation of the oscillating cradle mounted on an axis concentric with the axis of rotation of the brush, I provide the two fruit runways for each brush, and by varying the pitch or inclination of the supporting surfaces of the respective cradle side frame members, I subject the fruit in both runways to substantially the same action and pressure when the brushes are rotating in the direction of the arrows, Figure 1 of the drawings. Downwardly from each end member 25 extends an arm 28, and the arms at the corresponding ends of the cradles are connected by links 29, and the fulcrum point 30 of one of each of said link connections affords a pivotal connection for a driving link 31 connected through an eccentric pin 32 with drive disks 33 carried at opposite ends of the shaft 34. The shaft is mounted in bearings 36 in the cross members 5, and at one end carries a gear 37 intermeshing with a drive pinion 38 carried by one of the shafts 27.

It will be apparent that by connecting the cradles to oscillate through mechanism driven from the shaft 8, the cradles will oscillate in timed movement with the rotation of the brushes 21, and it will be observed that the fruit rolling by gravity longitudinally of the brushes in the runways will be subjected to a vigorous brushing action due to its movement longitudinally of the brush, and transversely of the brush in both directions. Suitable spray pipes 39 extend longitudinally of the main frame one over each brush 21, and afford a means for supplying moisture to the fruit as the same is acted on by the brushes.

I claim:—

1. A fruit washing apparatus comprising a rotatably mounted brush, a cradle mounted for oscillation concentrically of the axis of rotation of the brush, said cradle having parallel spaced sides cooperating with said brush at opposite sides of its longitudinal center providing therewith a pair of fruit runways, means for rotating said brush, means for oscillating said cradle, and means for feeding fruit to the runways.

2. A fruit washing apparatus comprising a rotatably mounted brush, a pair of members extending longitudinally of the surface thereof and each forming therewith a fruit runway, one disposed on each side of the axis of rotation of the brush, means for rotating the brush, and means for operating said members transversely over the surface of said brush.

3. A fruit washing apparatus comprising a rotatably mounted brush, a pair of members extending longitudinally of the surface thereof, and each forming with the brush surface a fruit runway, disposed one on each upper side of the axis of rotation of the brush, means for rotating the brush, means for oscillating said members simultaneously over the brush surface, the runway forming surfaces of said members being disposed at different angles from the periphery of the brush.

4. A fruit washing apparatus comprising a main frame, a supporting frame associated therewith, a brush rotatably mounted in said supporting frame, means for rotating said brush including a shaft connected therewith and extending transversely of said main and supporting frames and providing a fulcrum for one end of said supporting frame, means for adjustably mounting the end of said supporting frame, a member extending longitudinally of the brush surface and forming therewith a fruit runway, means for moving said member transversely over the surface of the brush, and means for supplying water to the fruit as brushed.

5. A fruit washing apparatus comprising a downwardly inclined rotatably mounted brush, a member extending parallel with the upper surface thereof in close proximity thereto and forming with said brush a fruit runway, means for oscillating said member over the upper surface of the brush, means for varying the inclination of said brush, and means for supplying water to the fruit as the same rolls by gravity downwardly of said runway.

6. A fruit washing apparatus including a supporting frame, a rotatably mounted brush carried thereby and inclined downwardly from one end of the frame to the other, a cradle consisting of end members and a pair of parallel spaced sides secured at their ends thereto and disposed parallel in close proximity with the brush surface on opposite sides of the upper surface thereof, forming with the brush surface a pair of parallel fruit runways, a drive shaft, a gear connection between the shaft and brush, and operating means for oscillating said cradle about said brush.

7. A fruit washing apparatus including a supporting frame, a rotatably mounted brush carried thereby and inclined downwardly from one end of the frame to the other, a cradle consisting of end members and a pair of parallel spaced sides secured at their ends thereto and disposed parallel in close proximity with the brush surface on opposite sides of the upper surface thereof, forming with the brush surface a pair of parallel fruit runways, means for rotating said brush, and means operated thereby and connected with opposite ends of the cradle for oscillating the same about the brush simultaneously with the rotation of the brush.

8. A fruit washing apparatus including a main frame, a supporting frame therein, a rotatable shaft extending transversely of the main frame and carried thereby, a supporting and fulcrum connection between one end of said supporting frame and shaft, means associated with the other end of the supporting frame for raising and lowering the same to vary the inclination thereof, a rotatable brush carried by said supporting frame and driven from said shaft, a member disposed parallel with the brush in cooperative relation therewith at one side of the upper surface thereof for providing with the brush a fruit runway, and means for oscillating said member transversely over said brush.

9. A fruit washing apparatus comprising a main frame and a supporting frame therein, a rotatable shaft extending transversely of the main and supporting frames and carried by the main frame, a supporting and fulcrum connection between one end of said supporting frame and shaft, means for raising and lowering the opposite end of said supporting frame, a pair of parallel spaced rotatably mounted brushes extending longitudinally of said supporting frame, means at one end of the frame for directing fruit to be washed thereonto, a spray pipe extending parallel with each brush above the same, a cradle associated with each brush and each consisting of end members one positioned on each end of the brushes and fulcrumed to swing on the axis of rotation of the brushes, and a pair of side members secured to the respective end members, said side members extending in parallel spaced relation on opposite sides of the upper surface of the respective brushes and each member forming with the brush a fruit runway, links connecting corresponding end members of said cradles, a connection between said shaft and brushes whereby the same are simultaneously rotated, and an operating connection associated with said cradles for oscillating the same about the axis of rotation of the brushes.

In testimony whereof I have signed my name to this specification.

EDWARD N. MAULL.